(No Model.) 5 Sheets—Sheet 1.

J. D. MANTION, G. H. MILLEN & A. DEOURION.
SLIDE MATCH BOX FILLING MACHINE.

No. 409,481. Patented Aug. 20, 1889.

Witnesses:
Chas. Raley.
L. N. Legendre.

John D. Mantion
Geo. H. Millen
Alfred Deourion
Inventors
A. Harvey
Attorney.

(No Model.) 5 Sheets—Sheet 2.
J. D. MANTION, G. H. MILLEN & A. DEOURION.
SLIDE MATCH BOX FILLING MACHINE.

No. 409,481. Patented Aug. 20, 1889.

(No Model.) 5 Sheets—Sheet 3.
J. D. MANTION, G. H. MILLEN & A. DEOURION.
SLIDE MATCH BOX FILLING MACHINE.
No. 409,481. Patented Aug. 20, 1889.
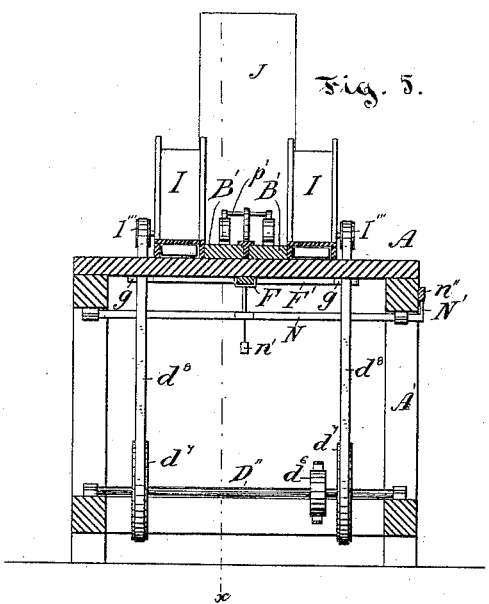
Fig. 5.
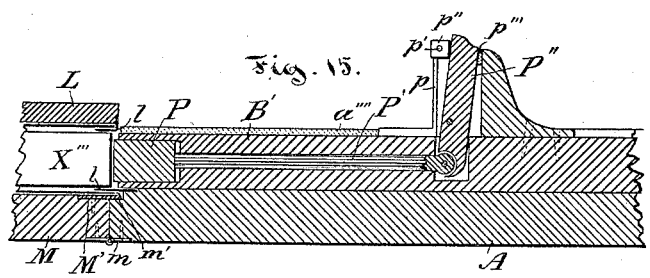
Fig. 15.
Fig. 17.
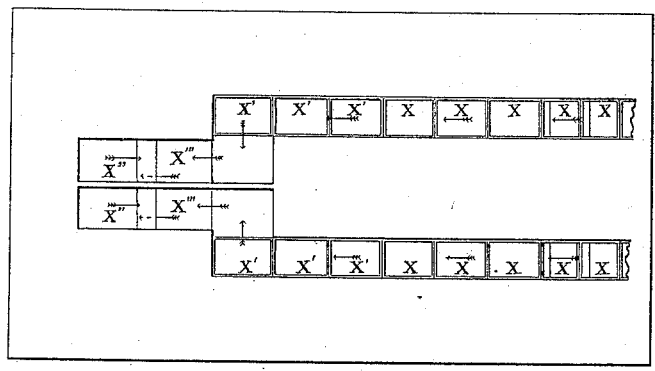
Witnesses:
Chas Raley.
L. N. Legendre.
John D. Mantion
Geo. H. Millen
Alfred Deourion
Inventors
A. Harvey
Attorney.

(No Model.)  5 Sheets—Sheet 4.
J. D. MANTION, G. H. MILLEN & A. DEOURION.
SLIDE MATCH BOX FILLING MACHINE.
No. 409,481. Patented Aug. 20, 1889.
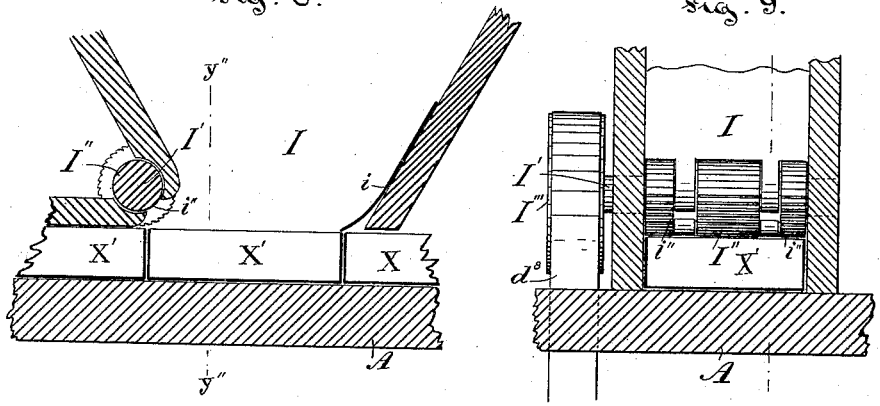

(No Model.) 5 Sheets—Sheet 5.
J. D. MANTION, G. H. MILLEN & A. DEOURION.
SLIDE MATCH BOX FILLING MACHINE.

No. 409,481. Patented Aug. 20, 1889.

Witnesses:
Chas Raley.
L. N. Legendre.

John D. Mantion
Geo. H. Millen
Alfred Deourion,
Inventors

A. Harvey
Attorney.

UNITED STATES PATENT OFFICE.

JOHN D. MANTION, GEORGE H. MILLEN, AND ALFRED DEOURION, OF HULL, QUEBEC, CANADA.

SLIDE MATCH-BOX-FILLING MACHINE.

SPECIFICATION forming part of Letters Patent No. 409,481, dated August 20, 1889.

Application filed April 24, 1889. Serial No. 308,473. (No model.)

*To all whom it may concern:*

Be it known that we, JOHN DANIEL MANTION, GEORGE H. MILLEN, and ALFRED DEOURION, all of the city of Hull, in the Province of Quebec, Dominion of Canada, have jointly invented certain new and useful Improvements in Slide Match-Box-Filling Machine; and we do hereby declare that the following is a full, clear, and exact description of the same, reference being had to the accompanying drawings, forming a part hereof.

Our invention, which will be hereinafter fully set forth and claimed, relates to machines for automatically filling and closing slide match-boxes.

The object of our invention is the construction of a machine that will replace the hand-labor in filling slide-boxes with matches and putting the box so filled into the sheath or cover.

Figure 1:
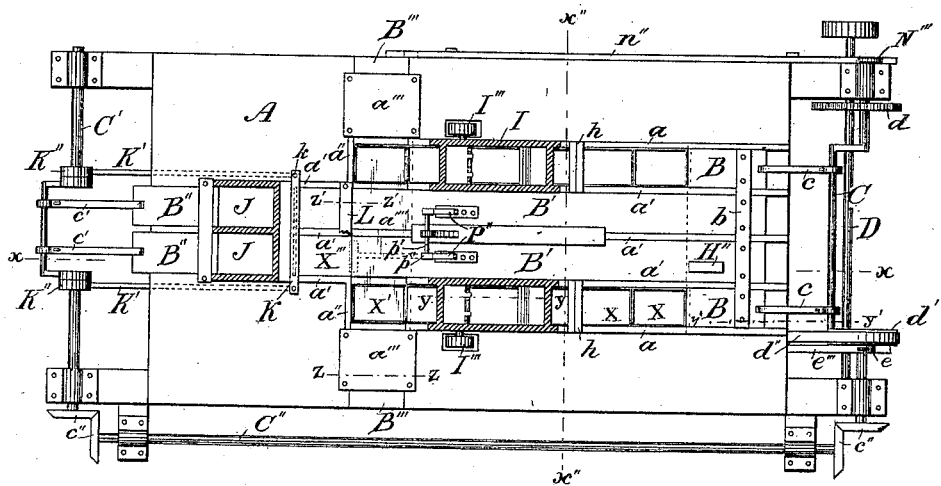
Figure 2:
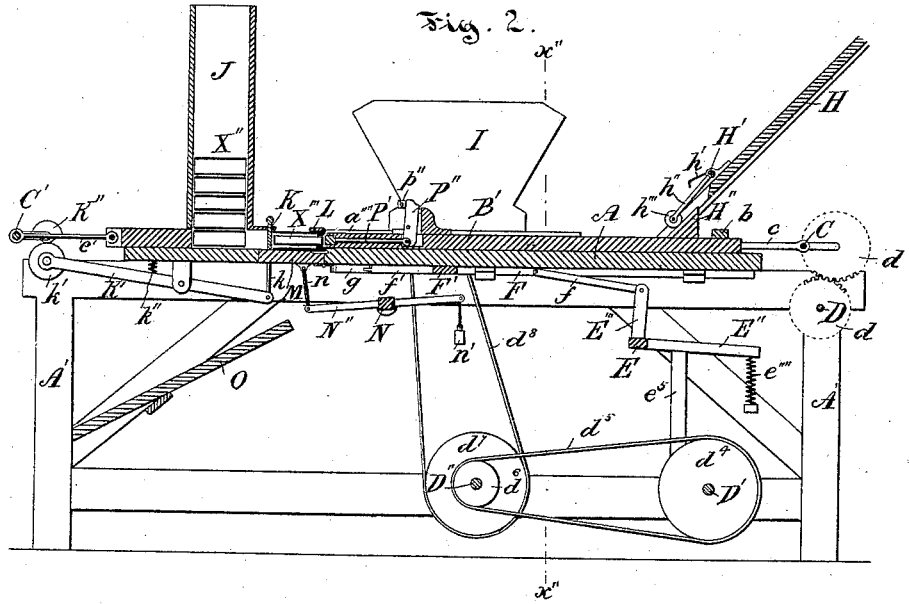
Figure 3:
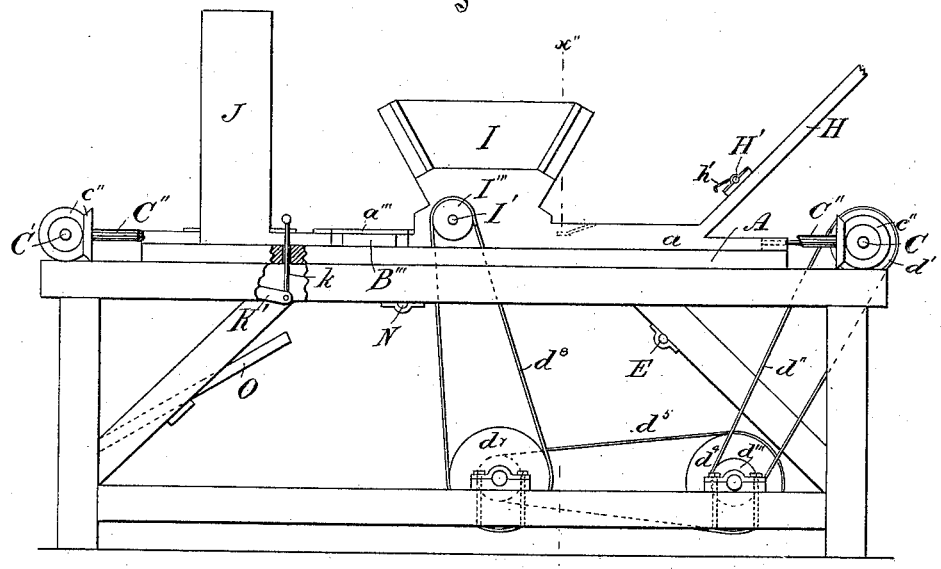
Figure 4:
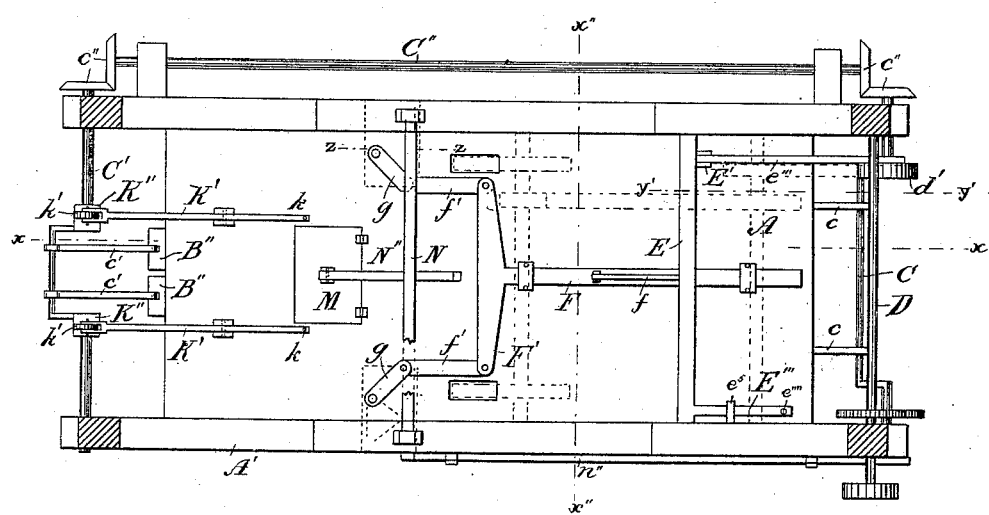
Figure 16:
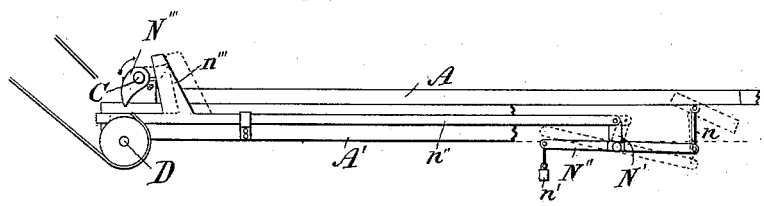
Figure 10:
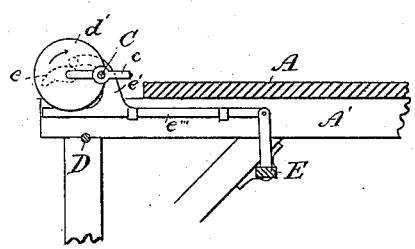
Figure 7:
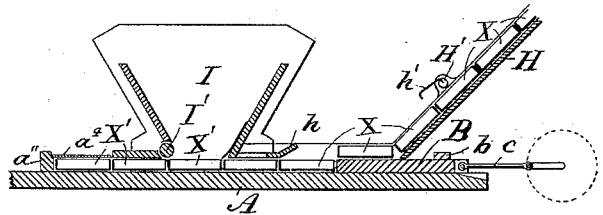

Figure 1 a top view of our new machine, having the device for supplying the empty boxes left off. Fig. 2 is a longitudinal vertical section of the same on line $x\,x$, Figs. 1, 4, 5, and 6. Fig. 3 is a side elevation of the same, corresponding to Figs. 1 and 2, parts being broken off to show construction at rear of same. Fig. 4 is an inverted or bottom view of the same, the delivery-slide being left off and the driving mechanism shown in dotted lines. Fig. 5 is a cross-section of the same on line $x''\,x''$, Figs. 1, 2, 3, and 4. Fig. 6 is a top view of the device for feeding empty boxes, corresponding to Figs. 1, 2, and 3. Fig. 7 is a vertical longitudinal section of the empty-box-feeding device on line $x'\,x'$, Fig. 6. Fig. 8 is a vertical longitudinal section on line $y\,y$, Fig. 1, on a larger scale, showing the bottom of the match-hopper and the device for taking from the filled boxes their surplus contents. Fig. 9 is a transverse sectional elevation of the same on line $y''\,y''$, Fig. 8. Fig. 10 is a vertical longitudinal section on line $y'\,y'$, Figs. 1 and 4, showing device for operating transverse pushers, the position relative to said figures being reversed. Fig. 11 shows the cam and slide for said device on a larger scale. Fig. 12 is a separate inverted view of one of the transverse pushers. Fig. 13 is a vertical sectional view of the same on line $z$ $z$, Figs. 12, 1, and 4. Fig. 14 is a vertical longitudinal section on line $z'\,z'$, Figs. 1 and 4, showing the device for inserting the filled boxes in their cases or covers. Fig. 15 is an enlarged part of Fig. 2, showing in detail the device for pushing the filled box a little farther in the cover. Fig. 16 is a partial side elevation showing the device for operating the trap-door for discharging completed boxes, the position relative to Figs. 1, 2, and 3 being reversed. Fig. 17 is a diagram showing the progress and direction of movement of the boxes and covers in a top view corresponding to Fig. 1.

The machine shown in the drawings is a double machine—*i. e.*, adapted to feed, fill, close, and discharge two boxes simultaneously.

A is a table supported by a frame A'. On this table four longitudinal ways, channels, or races are formed side by side, slats or strips $a\,a\,a'\,a'\,a'$ forming the sides thereof. The inner races extend the whole length of the table, the outer ones from the driving end the length of two match-boxes beyond the match-hopper, where the ends are closed by strips $a''$ and the races merged by a rectangular diversion into the inner ones, thus forming transverse races terminating transversely at the central race-guide $a'$. The width and depth of the outer and transverse races are such that the match-box intended to be filled will slide therein freely lengthwise, while the rear end of the inner races, extending to the transverse races, is adapted to accommodate the covers in the same way, and is consequently slightly larger in cross-section. Said races are fitted with piston-like slide blocks or pushers B B, B' B', B'' B'', and B''' B''', adapted to slide therein freely and to push the boxes and covers along therein, respectively, as the case may be, two pairs B and B' extending from the driving end and pushing the boxes, the pair B'' from the delivery end pushing the covers, and one pair B''' working in the crossways. The pushers B B', which may be coupled at their ends by a cross-bar $b$, receive a reciprocating motion from a crank-shaft C, Figs. 1, 2, 3, 4, 10, 11, and 16, with pitmen $c$, said crank-shaft being driven from the driving-shaft D by means of spur-wheels $d\ d$, both shafts being journaled in the frame A', or to brackets attached thereto. The pushers B'' receive a reciprocating motion from the crank-shaft C', Figs. 1, 2, 3, and 4, having pitmen $c'$, and being journaled to the rear end of the frame, said crank-shaft C' being geared to the crank-shaft C by a longitudinal shaft C'' and miter-gear $c''$. The cranks of the shafts C C' are set so that one set of slides or pushers advances when the other recedes. The outside pushers B are short, extending when projected fully the length of a match-box beyond the foot of the feed-slide, the central pushers B' are long and extend when projected to the rear side of the transverse races, the rear pushers B'' extend when projected just past the stop in the central race, and the side pushers B''' extend when projected inwardly the outside of the inner races. The throw of the pushers B B' is fully the length of a match-box, that of the pushers B'' the length of a cover, and that of the transverse pushers B''' fully the width of a box.

The transverse pushers B''' work in the transverse ways or races connecting the outside with the central races and receive a reciprocating motion as follows: Upon the straight portion of the crank-shaft C is a cam $e$, Figs. 11, 10, 1, and 4, against which bears the upward and forward projecting part $e'$ (with friction-bowl $e''$) of the rod $e'''$, which is held in guides on the under side of the table and has its free end pivoted to the arm E' of the rocking shaft E. The latter is pivoted below the table A, and is provided with another arm E'', which is drawn down by a spring $e''''$ and arrested by a stop $e^5$, thus holding the bowl $e''$ against the cam $e$.

F is a longitudinal slide-rod guided in bearings on the under side and center of the table A, and connected to the arm E''' of the rocking shaft E by a pitman $f$. The rear end of the rod F has a cross-head F', to each end of which is pivoted a link $f'$, connecting pivotally the lower crank-arm $g$ of the vertical double crank G, Figs. 4, 12, and 13. The double cranks G $g\ g'$ are journaled in the table A under the transverse slides B''', and their upper arms $g'$ set at about a right angle to the lower ones $g$ and provided with friction-bowls $g''$, which project into a triangular cavity $g'''$ of the same, against the sides of which cavity the arms bear, forcing them toward and from the center as the rod F slides to and fro. The transverse slides B''' are covered by plates $a'''$, secured to the table A, and the transverse races extending over the outer races the central ones are covered with glass $a''''$.

H, Figs. 2, 3, 6, and 7, is an inclined feed slide or chute having upon its upper surface races in line with and corresponding to the outside races $a\ a'$ upon the table A, upon which and over the pushers B B' the foot of said slide is secured. H' is a cross-shaft journaled to said slide, so as to clear the races and the empty boxes X in it. $h'\ h'$ are two curved fingers or stops fast upon said shaft—one over each race and reaching down in it—and $h''$ is an arm, also fast on said shaft, having a friction-bowl $h'''$, journaled at its free end, which rests upon one of the central slides B'. The latter is provided with an inclined plane or wedge H'', adapted to come in contact with the arm $h''$ and lift the same as it slides forward, thus lifting the fingers $h'$ and allowing them to drop again as the slide recedes and the wedge H'' passes from under the arm $h''$. When the fingers $h'$ are down, they hold the empty boxes X, and when the fingers are up they allow the boxes to slide down one farther and lie upon the pusher, which upon receding farther allows the box on each side to drop in the race upon the table ready to be pushed forward at the next stroke.

$h$ is a guard forming a mouth to the entrance of the race to insure the certain entry of the box in said race.

I I, Figs. 2, 3, 8 and 9, are two match-hoppers having inclined ends and being equal in width to the length of the matches. One of these hoppers is placed over each outside race and near the delivery end thereof, and so as to allow free entry and exit of boxes in the race under it.

$i$ is a fine plate spring secured to the inside of the lower end of the sloping hopper-front, so as to project a little below the lip of the same, and to come in contact with and overlap the upper edge of the empty box entering under it.

I' I' are two short cross-shafts placed in line and passing transversely through the lower rear end of said hoppers, each carrying within the hopper a fluted roller I'', having plain necks $i''$ turned in it. The position of said shafts, which are journaled upon the table A or in the sides of the hoppers, and the diameter of the rollers I'' upon them are so adjusted that the lowest point of the periphery of the latter does not reach below the upper edges of the boxes X, now filled, and named for distinction X', passing under them, and that the part of the periphery within the hopper falls in line with the inside of the sloping rear end of the hopper, the lip of the latter projecting into the spaces formed by the necks $i''$. The shafts I' have pulleys I''' upon them, and are driven by belts $d^8$ from a counter-shaft D'' with pulleys $d^7$, which receives motion by a belt $d^5$ and pulleys $d^6$ and $d^4$ from another counter-shaft D', which is driven from the crank-shaft C by a belt $d''$ over pulleys $d'''$ and $d'$.

J, Figs. 1, 2, and 3, is a double vertical hopper placed near the delivery end of the machine and over the two central races or slideways $a'\ a'\ a'$. The cross-section of this hopper is so dimensioned as to receive the cases or covers X" in two vertical piles (separated by a partition) and allow them to slide therein freely, and finally to drop into the race below.

K, Figs. 1 and 2, is a stop placed between the hoppers I and J, but near the latter, and extending across and through both the central races, intersecting the sides $a'\,a'\,a'$ thereof and working in said intersections. This stop is lifted at intervals to allow an empty cover to be pushed from under the bottom of each side of the hopper J and just past said stop, and then drop again, to act as a butt for the cover against any backward movement. This lifting motion is obtained as follows: A pin $k$, Figs. 2, 3, and 4, secured at each end of said stop passes vertically through the table A, and is adapted to slide up and down freely. The lower end is pivoted to a double lever K', fulcrumed pivotally at the under side of the table and carrying at its free end a friction-bowl $k'$, which is adapted to come in contact with a cam K", secured upon the straight part of the crank-shaft C', a spring $k''$ keeping the rear end of said lever against said cam. When the cam K" depresses the lever end $k'$, the stop K is raised, and when the depressing action of the cam ceases the stop drops again.

Adjoining the glass plate $a''''$ and the distance of the length of a cover X" from the stop K is a cross-bar L, secured over the top of the inner races, Figs. 1, 2, and 14. To the under side of this bar, and also to the bottom and each side of each race immediately below, is secured a fine plate-spring $l$, extending rearward and tending toward the center of the race. These springs are so thin that they may readily find room between the box and its cover, and they act as guides during the insertion of the former into the latter.

Immediately below the cover X", when in a position that it butts rearwardly against the stop K, and extending under the latter, but not extending quite to the front end of the cover, is a trap-door M set in the table A, and hinged to the same at its front end by a hinge $m$, Figs. 14, 16, 2, and 4. The upper surface of the trap-door is flush with the bottom of the rear part of the central races, and just so much below the surface of the forward part of the races as the bottom of the cover X" is lower than the bottom of the box X'. At the hinged end is secured a plate M', Fig. 14, terminating in an upwardly-projecting shoulder and hook $m'$, which projects a little above the rear toward the feed end and just beyond the end of the cover X", so as to catch its lower rear edge. This trap-door is opened and closed intermittently in the following manner, (shown in Figs. 16, 1, 2, and 4:) Upon the end of the crank-shaft C is a cam N''', bearing against the projections $n'''$ of a rod $n''$, held slidingly in guides on the frame A', and having its other end pivoted to the arm N' of the rocking shaft N. The latter carries a double lever N", one end of which is counterweighted by a weight $n'$ and the other connected pivotally to a link $n$, to which is pivoted to the under side of the trap-door M. The cam N'''' pushes the rod $n''$ forward and this tilts the rocking shaft N so as to draw the link $n$ downward and open the trap, as shown in dotted lines in Fig. 16, the counterweighted arm N" $n'$ lifting and closing the trap again and keeping the projection $n'''$ of the rod $n''$ against the cam N''''.

O is an inclined delivery-chute, on which the filled and closed boxes X''' fall from the trap M.

As the central pushers or slides B', which extend to the bar L, and which push the filled boxes X' into the covers X", can only push them far enough in to make the end of the box even with the end of the cover, and as it is desirable to have the covers a little longer than the boxes and to have the latter in the centre of the former, an auxiliary pusher is provided within the pushers B', as shown in Figs. 15, 1, and 2.

Within the ends of the pushers or slides B' is a rod P', having at its end a block or slide P, adapted to project beyond the end of the pusher B', a suitable cavity for the reception of said parts being provided in said pushers. The rod P' is pivoted to a short vertical lever P", fulcrumed pivotally to said pusher B' above its upper surface.

Upon the central guide $a'$ a bracket $p^2$ is secured, which holds a cross-bar $p'$, against which, or a block $p''$, secured thereon, the upper end of the lever P" is adapted to strike, thus slightly tilting it and projecting the rod P' and block P. The position of the cross-bar $p'$ and the length of the rod P' and block P are so adjusted that the lever P" strikes the cross-bar very near at the end of the stroke of the pusher B' and the leverage of the lever P", so that the motion of the block P is no more than to push the box in the center of the cover X". A stop $p'''$ is provided to prevent excessive movement of the lever P".

The machine operates as follows, and the progress of the work is illustrated in the diagram Fig. 17, in which X are the empty boxes, X' the filled boxes, X" the covers, and X''' the covers containing the filled and completed boxes, the direction of their movement being indicated by arrows. The empty boxes are fed lengthwise upon the feed-slide and deposited by hand or by an endless belt into the races thereon. Down these races upon the feed-slide the boxes slide by gravity, being held up by the fingers $h'$. When the pushers B and B' advance, the wedge H" lifts the arm $h''$, and thus the fingers $h'$ momentarily, so as to allow one box in each race to escape and to drop down again and catch and retain the next. The box that has been released drops upon the outer pusher B, and when this recedes it drops in the race upon the table. The next successive strokes of the pushers B bring the box under the hopper I, it passing in under the spring $i$, which prevents the matches with which the hopper is now filled, and which lie in it transversely, falling out. As empty boxes enter under the hopper they fill with matches, and as they proceed onward and out the fluted roller I″, (which may be of rubber,) rotating in the opposite direction to the progress of the boxes, pushes off the surplus filling and leaves the contents level with the edges of the box. The lips of the rear end of the hopper overhanging the surface of the roller I″, and level therewith, prevent the matches being thrown upward. When the filled box X′ has passed from under the hopper, the next stroke of the pusher B brings the box to the end of the outside race and under the glass plate a″″, which allows it being inspected. As soon as it has arrived in that position the transverse pusher B‴ pushes the box broadside on along the transverse race under the glass top into the central race, leaving it ready to be pushed into the cover. In the meantime each of the pushers B″ has pushed an empty cover X″, dropped from the hopper J into the central race under it, from under the pile in the hopper, past the stop K, which has been lifted in due course for the purpose and dropped again, forming an abutment for the cover and preventing its rearward movement, and deposited said cover upon the trap-door M in the position shown in Fig. 14, the edges of its mouth having entered the V-like recesses formed by the springs $l$, which project within the cover and overlap and cover the edges of its mouth, thus forming a smooth and certain entrance for the box X′. The next stroke of the central pushers B′ now push the filled box X′ readily into the cover, the auxiliary pushers P giving it a slight additional advance, so as to leave them in the center of the cover. Immediately after this the trap-door M opens, turning upon its hinges $m$, thereby imparting a slight downward movement by means of the shouldered plate M′ m′, which draws it away from the springs $l$ and allows it to slide down the trap by gravity and to drop on the delivery-chute O. The trap-door M immediately closes ready for a repetition.

We claim as our invention—

1. A match-box-filling machine comprising a frame and table, parallel longitudinal races for the match-boxes thereon, parallel longitudinal races in continuation of the central races for the match-box covers, transverse races for the transfer of the boxes from one race to another, pushers in said races having a reciprocating motion working in opposite and transverse directions, an inclined feed-slide provided with races to receive boxes and with means of holding and releasing them, a match-hopper placed over each race holding empty boxes and permitting boxes to pass under the same, and provided with a spring at the entrance and a rotary roller at its exit, a vertical cover-hopper placed over each cover-race, a stop placed across the cover-race between the cover-hopper and match-hopper, said stop having an intermittent lifting action, a set of fine plate-springs in the cover-race projecting toward and into the cover, and a downwardly-hinged trap-door having an intermittent downward swinging movement and provided at its upper surface at the hinged end with a forwardly-projecting plate with upward shoulder, substantially as set forth.

2. In a match-box-filling machine, the combination of the table A, supported on a frame, guides $a$ $a'$ $a''$, forming races on said table, longitudinal pushers B, B′, and B″, working in said races, crank-shafts C and C′ at the ends of said frame and connected by the shaft C″, and miter-gear with pitmen $c$ $c'$, giving alternate reciprocating motion to said pushers, cam $e$ on shaft C, rod $e'''$, operated by said cam and pivoted to the arm E′, rocking shaft E, having arm E′, balanced arm E″, and arm E‴, pivoted to a pitman, pitman $f$, pivoted to said arm E‴ and to a slide-rod, slide-rod F, connected to said pitman and having a cross-head F′, double vertical crank G, journaled in the table and having crank-arms $g$ $g'$ connected to the cross-heads by links, links $f'$, connecting cranks and cross-head, and the transverse pushers B‴, each having a triangular cavity adapted to receive the upper crank-arm $g'$, set at a right angle to the lower arm $g$, to be operated thereby, substantially as set forth.

3. In a match-box-filling machine, the combination of the table A, provided with guides forming races thereon, reciprocating pushers in said races, an inclined feed-slide H, near the end of the table, having races thereon corresponding to the outer races on the table, a transverse shaft H′, journaled over said races, fingers $h'$ on said shaft over said races, an arm $h''$ on said shaft over one of the central slides, and an incline or wedge H″ on said central slide adapted to lift said arm, substantially as set forth.

4. In a match-box-filling machine, the combination of a table A, guides thereon forming races, reciprocating pushers in said races, a match-hopper I over each outside race, a fine spring $i'$ at the lower inside front edge of said hopper, and a shaft I′, near the lower inside rear edge thereof and carrying a fluted roller I″, having necks $i''$, said roller flush with the inner rear end of said hopper and partly covered thereby, and its lowest point level with the top of the race, substantially as set forth.

5. In a match-box-filling machine, the combination of a table A, guides thereon forming races, reciprocating pushers in said races, and a vertical cover-hopper J, near the rear end of the table set over the central races, substantially as set forth.

6. In a match-box-filling machine, the combination of a table A, guides thereon forming races, reciprocating pushers in said races, a crank-shaft C′ at the rear end of said table, a stop K, intersecting the central races transversely, a sliding pin $k$, secured at each end of said stop and passing vertically through said table and pivoted below the table to the end of a double lever, a double lever K', pivoted to each pin fulcrumed to the under side of said table and held up by a spring, the other end reaching under the crank-shaft C', and a cam K'' on said crank-shaft, adapted to depress said end of the lever, substantially as set forth.

7. In a match-box-filling machine, the combination of a table A, having guides thereon forming races, reciprocating pushers in said races, a crank-shaft C at the front end of said table, a trap-door M, hinged in said table and having a shouldered forwardly-projecting plate M' at the upper surface of the hinged end, a link n, pivoted to the under side of said trap and the arm of a rocking shaft, a rocking shaft N, having a double arm N'' pivoted to the link n and counterbalanced at the other end, and a rocking arm N', pivoted to a rod, the rod n'', pivoted to the said rocking arm and having upward projection n''', bearing against a cam, and the cam N'''' upon the crank-shaft C, substantially as set forth.

8. In a match-box-filling machine, the combination of the table A, having guides a' to form races, a pusher B', provided at its operating end with a cavity, a rod P', carrying a slide P in said cavity, an upright lever P'', pivoted at its lower end to said rod and fulcrumed to said pusher, a bracket p, secured to the central guide a', and a cross-bar p', secured to said bracket and adapted to be struck by the upper end of the lever P'' when the pusher B' is near the end of its stroke, substantially as set forth.

In testimony whereof we have signed in the presence of the undersigned witnesses.

JOHN D. MANTION.
GEO. H. MILLEN.
ALFRED DEOURION.

Witnesses:
B. HARVEY,
A. TROWSE.